(12) United States Patent
De Forges et al.

(10) Patent No.: US 8,177,202 B2
(45) Date of Patent: May 15, 2012

(54) DAMPING DEVICE AND AIRCRAFT ROTOR SYSTEM INCORPORATING IT

(75) Inventors: Hervé Richer De Forges, Evreux (FR); Jean-Pierre Ciolczyk, Montargis (FR)

(73) Assignee: Hutchinson, Paris (FR)

( * ) Notice: Subject to any disclaimer, the term of this patent is extended or adjusted under 35 U.S.C. 154(b) by 574 days.

(21) Appl. No.: 12/398,445

(22) Filed: Mar. 5, 2009

(65) Prior Publication Data

US 2009/0224449 A1    Sep. 10, 2009

(30) Foreign Application Priority Data

Mar. 6, 2008  (FR) ...................................... 08 01220

(51) Int. Cl.
*B60G 13/00*    (2006.01)
(52) U.S. Cl. .................. 267/219; 267/140.11; 188/298; 244/17.27
(58) Field of Classification Search .................. 267/291, 267/33, 34, 35, 140.11, 140.13; 188/297, 188/298; 244/17.27, 17.25, 17.17, 22, 54
See application file for complete search history.

(56) References Cited

U.S. PATENT DOCUMENTS

| | | | |
|---|---|---|---|
| 3,217,810 A | 11/1965 | Derschmidt | |
| 4,832,319 A | 5/1989 | Noguchi et al. | |
| 4,858,733 A * | 8/1989 | Noguchi et al. | 188/267.1 |
| 4,974,794 A * | 12/1990 | Aubry et al. | 244/17.27 |
| 5,004,215 A * | 4/1991 | Aubry et al. | 267/140.13 |
| 5,219,430 A | 6/1993 | Antoine | |
| 5,251,883 A * | 10/1993 | Simon et al. | 267/136 |
| 5,312,093 A | 5/1994 | Smith et al. | |
| 5,540,549 A * | 7/1996 | McGuire | 416/140 |
| 5,957,440 A * | 9/1999 | Jones et al. | 267/140.14 |
| 6,092,795 A * | 7/2000 | McGuire | 267/140.11 |
| 6,378,851 B1 * | 4/2002 | McGuire | 267/140.13 |
| 6,431,530 B1 * | 8/2002 | Stamps et al. | 267/136 |

FOREIGN PATENT DOCUMENTS

EP    0 511 055 A    10/1992

OTHER PUBLICATIONS

Search Report from French Priority Application No. 08 01220, Filed Mar. 6, 2008.

* cited by examiner

*Primary Examiner* — Pamela Rodriguez
(74) *Attorney, Agent, or Firm* — Alston & Bird LLP

(57) ABSTRACT

The damping device is intended to form a drag-mode damper for a helicopter blade, and is incorporated in an aircraft rotor system. This damping device comprises: an external frame intended to be coupled to a first rotating element, and a radially internal element mounted coaxially to the frame and intended to be coupled to a second rotating element; at least one elastomer damper of annular cross section mounted fixedly to the frame and to the internal element; and a working chamber bounded by the frame and by the damper and communicating with a compensation chamber bounded by a highly deformable flexible member mounted coaxially to the internal element. The working chamber is formed at a first end of the device and communicates with the compensation chamber via a porous structure surmounting an end opening of the flexible member, which member is mounted in the internal element.

10 Claims, 2 Drawing Sheets

DAMPING DEVICE AND AIRCRAFT ROTOR SYSTEM INCORPORATING IT

CROSS REFERENCE TO RELATED APPLICATION

This application claims priority to French Application No. 08 01220, filed Mar. 6, 2008.

FIELD AND BACKGROUND OF THE INVENTION

The present invention relates to a damping device, in particular intended to form a drag-mode damper for a helicopter blade, and to a rotary-wing aircraft rotor system, such as a helicopter rotor, incorporating this device. The invention applies in a general manner to dampers used not only in the aeronautical sector but also in other industrial sectors which involve angular oscillations about an articulation adjacent to a rotor.

In a known manner, the lifting rotors of helicopters have an articulated-type hub which, for each blade, is provided with an articulation, known as a drag hinge, which is situated about an axis perpendicular to the plane of the blade and which provides said blade with a freedom of angular oscillation in the plane of rotation of the rotor. It is sought to provide an elastic return of each blade toward its mean angular position about this articulation so as to be able to adjust the natural frequency of the whole of each blade in drag, it being pointed out that it is necessary to damp these angular drag oscillations of blades in order to minimize the transmission of dynamic drag forces from each blade toward the structure of the helicopter.

The known drag-damping devices which are used between each blade and the rotor are primarily of two types.

As illustrated in appended FIG. 1, a first type of such devices 1 can be distinguished, this type using only one elastomer damper 2 of annular cross section (usually based on a silicone rubber) which is sheared between the respective walls of an external cylindrical frame 3 and of an internal tube 4. A major disadvantage with this solution, which is very simple to implement, lies, on the one hand, in the very high degree of stiffening of the device with respect to the low excitation amplitudes and, on the other hand, in its excessive sensitivity to the outside temperature. Another disadvantage with this first type of damping devices is that they are especially designed for use on lightweight aircraft.

A second type of drag-damping devices, primarily for large aircraft, can be distinguished, this type using complex hydraulic systems usually based on valves, pistons and calibrated passages, and making it possible to maintain an approximately constant damping level over a wide range of excitation amplitudes. Mention may be made, for example, of document EP-B-0 759 128 for the description of such a device, which comprises two annular elastomer dampers which are mounted around an internal tube and which are separated from one another by an annular compensation chamber having a piston communicating with likewise annular working chambers, it being pointed out that this compensation chamber can also be bounded by a diaphragm or a metal bellows. Although these devices are relatively well-performing, they nevertheless have the disadvantage of entailing a certain degree of technical complexity, which additionally requires a lot of maintenance.

SUMMARY OF THE INVENTION

One object of the present invention is to provide a damping device which overcomes the aforementioned disadvantages, this device being particularly intended to form a drag-mode damper for a helicopter blade and comprising:

- a radially external frame intended to be coupled to a first rotating element, such as a helicopter blade, and a radially internal element mounted coaxially to the frame and intended to be coupled to a second rotating element, such as a helicopter rotor, the frame and the internal element each having a symmetry of revolution;
- at least one elastomer damper of annular cross section mounted fixedly to the frame and to the internal element; and
- a working chamber which is bounded by the frame and by the elastomer damper and which communicates with a compensation chamber bounded by a highly deformable flexible member mounted coaxially to the internal element, these chambers being filled with a hydraulic fluid.

To this end, a damping device according to the invention is such that the working chamber is formed at a first end of the device and communicates with the compensation chamber via a porous structure surmounting an end opening of the flexible member, which member is mounted inside the internal element such that, in response to relative movements of the frame and the internal element, the variation in volume of the working chamber forces the fluid to flow across this porous structure in order for the compensation chamber to compensate for this variation in volume.

It will be noted that this device according to the invention makes it possible to maintain a substantially constant damping level independently of the amplitude of the excitation, for example over a range of excitation vibrations ranging from approximately 0.5 mm to 20 mm between a helicopter rotor and blade, while offering a relatively simple structure even in the case of relatively heavy aircraft, and that this device also offers the advantage of having a low sensitivity to temperature, thus satisfactorily overcoming the aforementioned disadvantages associated with the two types of damping devices specified above.

According to one particular embodiment of the invention, said porous structure may be formed by a metal disk based on a sintered material or compressed fibers.

Advantageously, said flexible member may be formed by a metal bellows or by an elastic membrane and is movably mounted in contact with the wall of said internal element.

More advantageously still, said flexible member may be formed by a diaphragm-type metal bellows which is guided inside said internal element by guide means which are capable of opposing the centrifugal force undergone by the device. These guide means may, for example, comprise:

- an antifriction coating for said bellows that is formed on the radially internal surface of the wall of said internal element, and/or
- a tube fastened to said porous structure and extending against the radially internal surface of the wall of said bellows, along this bellows.

According to another feature of the invention, said damping device additionally advantageously comprises an auxiliary chamber which is formed at a second end of the device while being bounded by said internal element opposite said elastomer damper, and in which chamber is confined a pressurized gas in order to prevent cavitation of said fluid in said working and compensation chambers.

According to another feature of the invention, the elastomer damper may extend substantially over the whole axial length of said internal element, which preferably has a cylindrical wall, and substantially over a likewise cylindrical portion of said frame that is situated opposite.

It will be noted, as a variant, that the walls of the frame and of the internal element according to the invention could, as a variant, have frustoconical shapes or sections instead of or in addition to cylindrical sections.

Also in a preferred manner, said frame has, at said first end of the device, a substantially frustoconical portion extending said cylindrical portion and externally bounding said working chamber.

A rotary-wing aircraft rotor system according to the invention, such as a helicopter rotor, comprises at least one damping device as defined above between the rotor and said wing.

Advantageously, the Applicant has been able to establish that this damping device according to the invention is able to provide this system, between the rotor and said wing, with a vibration-damping level which is substantially constant over a range of excitation vibration amplitudes ranging from 0.5 mm to 20 mm, this level moreover being substantially independent of the outside temperature.

BRIEF DESCRIPTION OF THE DRAWINGS

Other advantages, features and details of the invention will become apparent from the remainder of the description which will follow with reference to appended drawings given purely by way of examples and in which.

MORE DETAILED DESCRIPTION

Figure 1:
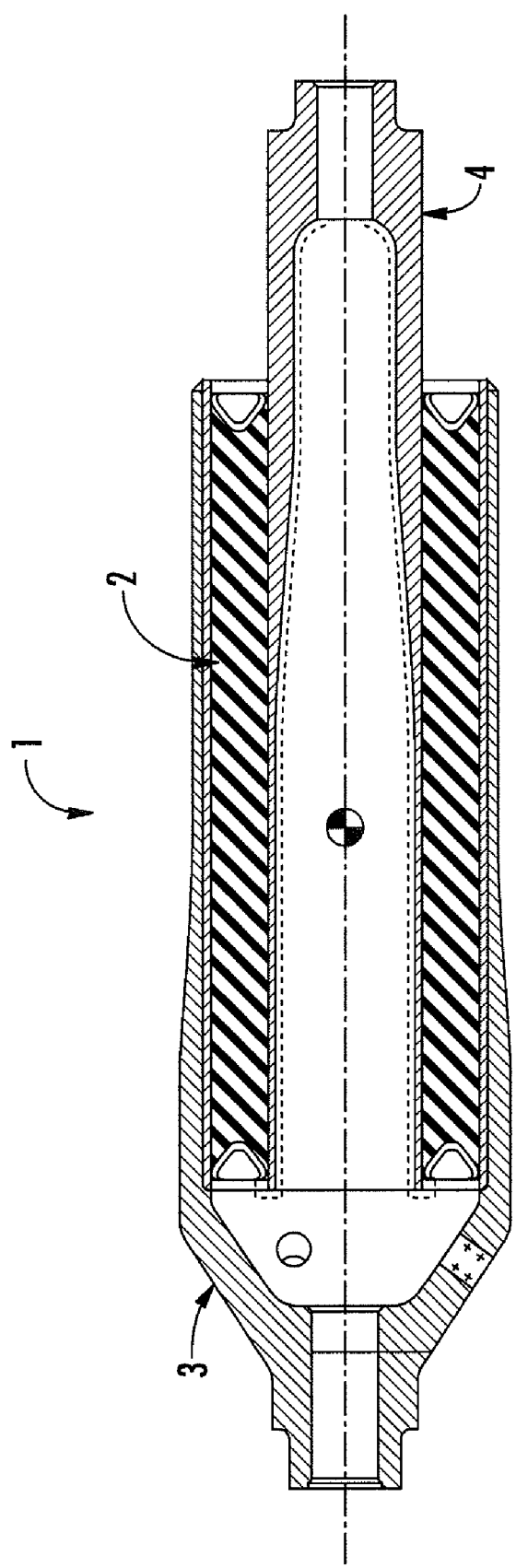
FIG. 1 is a view in axial section of a drag-mode damping device according to one example of the prior art.
Figure 2:
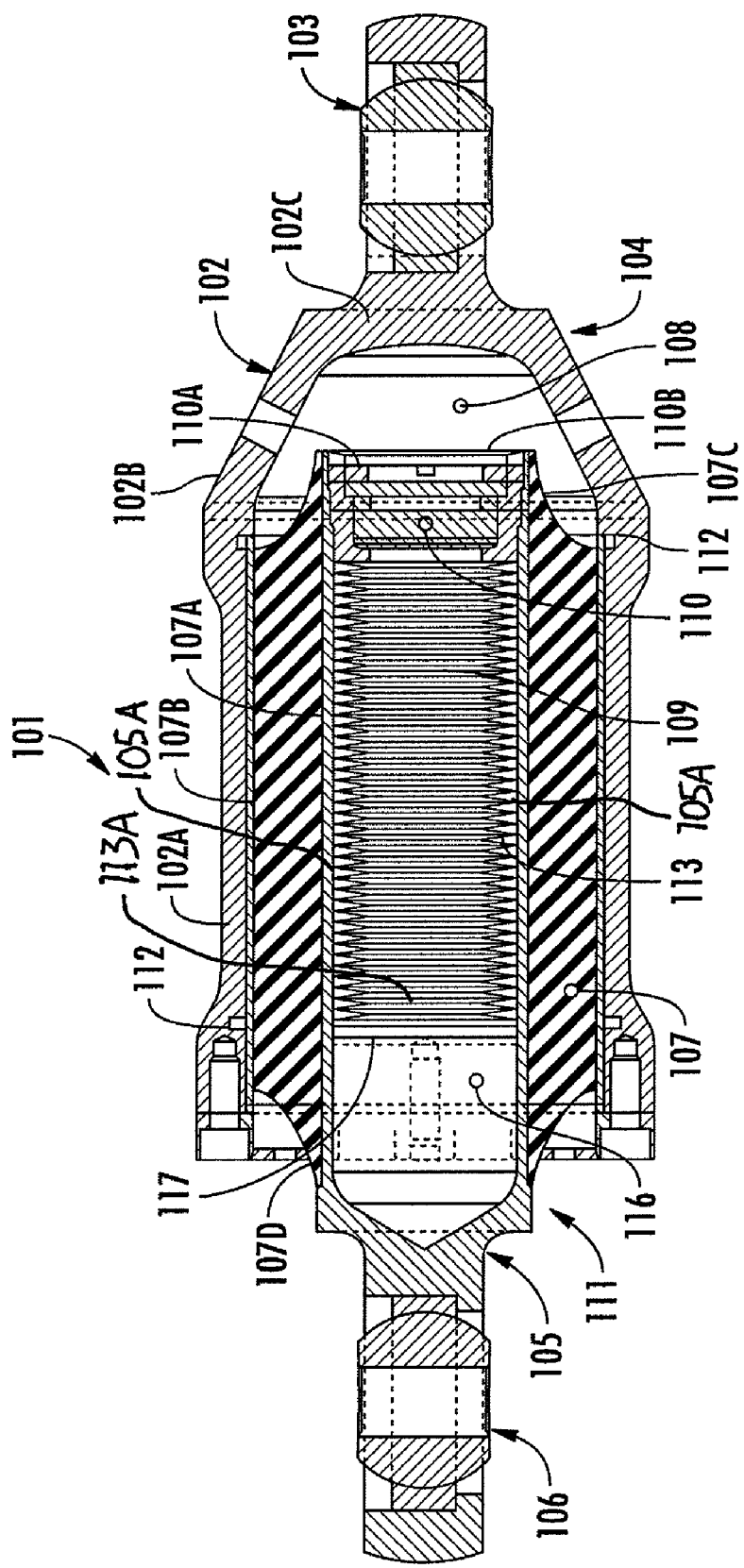
FIG. 2 is a view in axial section of a drag-mode damping device according to the invention.

As illustrated in FIG. 2, a damping device 101 according to the invention, which is designed in particular to damp the drag mode of helicopter blades, essentially comprises:
- a radially external frame 102 which is intended, for example, to be coupled to a helicopter blade (not illustrated) by a first articulation 103 and which comprises a generally cylindrical portion 102a extended by a convergent frustoconical portion 102b at a first end 104 of the device 101 that is adjacent to this first articulation 103;
- a radially internal tubular element 105 mounted coaxially to the frame 102 and intended, for example, to be coupled to a helicopter rotor (not illustrated) by a second articulation 106;
- an elastomer damper 107 of annular cross section mounted fixedly to the frame 102 and to the internal element 105; and
- two hydraulic chambers, a working chamber 108 and a compensation chamber 109, which are respectively formed at the first end 104 of the device 101 and inside the internal element 105 and which communicate with one another via a porous structure 110, these chambers 108 and 109 both being filled with a hydraulic fluid such as a silicone oil, for example.

More precisely, the elastomer damper 107 extends virtually over the whole axial length of the internal element 105 and of the cylindrical portion 102a of the frame 102 that is situated opposite. This damper 107 has, as viewed in axial half-section, substantially an isosceles trapezoid shape of which the large cylindrical base 107a is secured to the respective external surfaces of the cylindrical walls of the internal element 105 and of the porous structure 110, of which the small cylindrical base 107b is secured to the internal surface of the cylindrical portion 102a of the frame 102, of which a first annular lateral side 107c is fastened at the first end 104 of the device 101 and of which a second annular lateral side 107d is fastened against a second end 111 of the device 101 that is adjacent to the second articulation 106.

The damper 107 is mounted fixedly to the frame 102, to the internal element 105 and to the porous structure 110 via mechanical fastening means 112 which pass radially through the corresponding walls of these three assemblies.

The working chamber 108 is bounded, firstly, by the frustoconical portion 102b of the frame 102 and by a substantially radial end portion 102c of the frame 102 where the frustoconical portion 102b converges, and, secondly, by the annular lateral side 107c of the damper 107 and by the porous structure 110.

The compensation chamber 109 is bounded by a highly deformable flexible member 113 mounted coaxially and inside the internal element 105, over most of the axial length thereof. In the preferred example shown in FIG. 2, the flexible member 113 consists of a diaphragm-type metal bellows in which the peaks of the convolutions are guided against the internal surface of the wall of the internal element 105 by guide means (not visible) which are capable of opposing the centrifugal force undergone by the device 101 during use on account of the rotation of the adjacent rotor. These guide means may comprise an antifriction coating 105A radially outside the bellows 113 that is formed by a lining of the internal surface of the wall of the internal element 105, advantageously combined with the mounting of a tube 113A radially inside the bellows 113 that is fastened to the porous structure 110 and that extends along the bellows 113 against the internal surface of the troughs of its convolutions.

The porous structure 110 surmounts an end opening of the bellows 113, and it is advantageously formed by a circular cartridge or metal disk based on a sintered material or compressed fibers and anchored in an annular support 110a of which a circular external base 110b is mounted level with the first side 107c of the elastomer damper 107.

The damping device 101 according to the invention additionally comprises an auxiliary chamber 116 which is formed at the second end 111 of the device 101 while being bounded by that part of the internal element 105 opposite the damper 107, in which chamber is confined a pressurized gas in order to prevent cavitation of the hydraulic fluid which fills the other two chambers, i.e. the working chamber 108 and compensation chamber 109. This auxiliary chamber 116 is separated from the bellows 113, and hence from the compensation chamber 109 enclosed by said bellows, by a circular radial plate 117 which forms a sealed partition.

During operation, and in response to movements imposed at the two ends 104 and 111 of the damping device 101, the variation in volume of the working chamber 108 forces the hydraulic fluid to flow across the porous structure 110 in order for the compensation chamber 109 to compensate for this variation in volume, and thus satisfactorily damp the drag-mode vibrations of each helicopter blade, in this exemplary embodiment, with a damping level which is virtually independent of the excitation amplitude and the outside temperature.

The invention claimed is:

1. A damping device intended to form a drag-mode damper for a helicopter blade, comprising:
   a radially external frame intended to be coupled to a first rotating element and a radially internal element mounted coaxially to the frame and intended to be coupled to a second rotating element, the frame and the internal element each having a symmetry of revolution;

at least one elastomer damper of annular cross section mounted fixedly to the frame and to the internal element; and a working chamber which is bounded by the frame and by the elastomer damper and which communicates with a compensation chamber bounded and enclosed by a highly deformable flexible member mounted coaxially to the internal element, these chambers being filled with a hydraulic fluid, wherein the working chamber is formed at a first end of the device and communicates with the compensation chamber via a porous structure surmounting an end opening of the flexible member, which member is mounted inside the internal element such that, in response to relative movements of the frame and the internal element, the variation in volume of the working chamber forces the fluid to flow across this porous structure in order for the compensation chamber to compensate for this variation in volume.

2. A damping device according to claim 1, wherein said porous structure is formed by a metal disk based on a sintered material or compressed fibers.

3. A damping device according to claim 1, wherein said flexible member is formed by a metal bellows or by an elastic membrane and is movably mounted in contact with the wall of said internal element.

4. A damping device according to claim 3, wherein said flexible member is formed by a diaphragm-type metal bellows which is guided inside said internal element by guide means which are capable of opposing the centrifugal force undergone by the device.

5. A damping device according to claim 4, wherein said guide means comprise:

an antifriction coating for said bellows that is formed on the radially internal surface of the wall of said internal element, and/or a tube fastened to said porous structure and extending against the radially internal surface of the wall of said bellows, along this bellows.

6. A damping device according to claim 1, additionally comprising an auxiliary chamber which is formed at a second end of the device while being bounded by said internal element opposite said elastomer damper, and in which chamber is confined a pressurized gas in order to prevent cavitation of said fluid in said working and compensation chambers.

7. A damping device according to claim 1, wherein said elastomer damper extends substantially over the whole axial length of said internal element, which has a cylindrical wall, and substantially over a likewise cylindrical portion of said frame that is situated opposite.

8. A damping device according to claim 7, wherein said frame has, at said first end of the device, a substantially frustoconical portion extending said cylindrical portion and externally bounding said working chamber.

9. A rotary-wing aircraft rotor system comprising at least one damping device according to claim 1 between the rotor and said wing.

10. An aircraft rotor system according to claim 9, wherein said device is able to provide this system, between the rotor and said wing, with a damping level which is substantially constant over a range of excitation vibration amplitudes ranging from 0.5 mm to 20 mm, this level moreover being substantially independent of the outside temperature.

* * * * *